United States Patent [19]

Koch et al.

[11] 4,090,969
[45] May 23, 1978

[54] METHOD OF OIL RECOVERY BY FLOODING EMPLOYING BETAINE SOLUTIONS

[75] Inventors: Karlheinz Koch, Haan; Horst Rutzen, Langenfeld, both of Germany

[73] Assignee: Henkel Kommanditgesellschaft auf Aktien, Dusseldorf-Holthausen, Germany

[21] Appl. No.: 758,039

[22] Filed: Jan. 10, 1977

[30] Foreign Application Priority Data

Jan. 10, 1976   Germany ............................. 2600778

[51] Int. Cl.$^2$ ............................................ E21B 43/22
[52] U.S. Cl. .............................. 252/8.55 D; 166/274; 166/275; 260/501.13
[58] Field of Search ..................... 252/8.55 D, 8.55 B, 252/DIG. 7; 166/274, 275; 260/501.13

[56] References Cited

U.S. PATENT DOCUMENTS

| | | | |
|---|---|---|---|
| 3,275,552 | 9/1966 | Kern et al. | 252/8.55 |
| 3,360,550 | 12/1967 | Cowen et al. | 260/501.13 |
| 3,792,731 | 2/1974 | Feuerbacher et al. | 166/274 |
| 3,811,505 | 5/1974 | Flournoy et al. | 252/8.55 X |
| 3,888,797 | 6/1975 | Marumo | 260/534 M |
| 3,939,911 | 2/1976 | Maddox et al. | 166/274 |

*Primary Examiner*—Herbert B. Guynn
*Attorney, Agent, or Firm*—Hammond & Littell

[57] ABSTRACT

A method of extracting mineral oil from subterranean formation by flooding comprising the steps of forcing an aqueous liquid into a subterranean formation containing mineral oil and displacing the mineral oil through at least one bore hole in the subterranean formation, said aqueous liquid containing from 0.01% to 15% by weight of an amphoteric surface-active compound selected from the group consisting of (1) a betaine having the formula

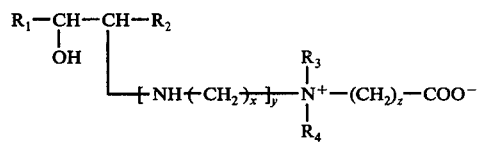

wherein $R_1$ and $R_2$ are members selected from the group consisting of hydrogen and alkyl having from 1 to 18 carbon atoms, with the proviso that the sum of the carbon atoms in $R_1 + R_2$ is from 9 to 18, $R_3$ and $R_4$ are members selected from the group consisting of lower alkyl and lower alkylol, $x$ is an integer from 2 to 4, $y$ is an integer from 0 to 1 and $z$ is an integer from 1 to 4, and (2) mixtures of said betaine with up to 20% by weight of an acid having the formula

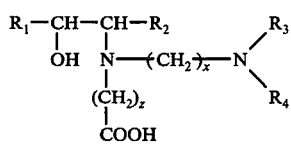

wherein $R_1$, $R_2$, $R_3$, $R_4$, $x$ and $z$ have the above-assigned values.

5 Claims, No Drawings

METHOD OF OIL RECOVERY BY FLOODING EMPLOYING BETAINE SOLUTIONS

THE RELATED ART

In addition to the conventional primary methods of extracting mineral oil, additional so-called secondary or tertiary methods are now being used to exploit the considerable quantities of mineral oil which cannot be extracted from subterranean reservoirs by primary methods. So-called flooding is one of the most common of these methods. In this method, an aqueous liquid, the flood water, is forced under adequate pressure at one or a plurality of points into a subterranean reservoir carrying mineral oil, and the mineral oil is displaced in the direction of one or a plurality of bore holes from which the oil is delivered. Approximately 30% to 50% of the mineral oil not obtained by primary methods can be extracted by this secondary method.

The effectiveness of mineral oil extraction by flooding is substantially increased by using surface-active compounds or tensides in the flood water which is generally produced from the formation water. The effect of the tensides depends, on the one hand, upon the increase in the wettability of the oil-bearing formation by water and, on the other hand, upon the decrease in the interfacial tension between the oil phase and the water phase. The greater the extent to which the tensides are able to reduce the interfacial tension, the greater is the improvement in the extraction of mineral oil by flooding.

Furthermore, it is known to use water-soluble polymers in the flood water, thus decreasing the mobility of the flood water or increasing its viscosity. This results in a more favorable mobility ratio between the water phase and the oil phase and also leads to improved delivery of the mineral oil. Examples of such water-soluble polymers are various hydrolyzed acrylamide polymers or copolymers.

In accordance with the state of the art, it is customary to force the aqueous mixtures or solutions of tensides into the subterranean reservoir containing mineral oil and then to displace them by aqueous systems of small mobility, such as aqueous solutions of polymers, in order to improve the extraction of mineral oil.

Nonionic or anionic surface-active compounds, chiefly so-called petroleum sulfonates, have hitherto been proposed as tensides (for example, in German Published Application DOS No. 24 30 935), although they have the disadvantage that they are only soluble in soft water and formation water having a low salt content. Thus, a large number of the surfactants proposed hitherto cannot be used for deposits in which highly saline formation waters having salt contents of 10 to 30% are found, such as in most of the German mineral oil deposits.

OBJECTS OF THE INVENTION

An object of the present invention relates to the use of betaines in the secondary or tertiary extraction of mineral oil from subterranean mineral oil bearing formations by flooding.

Another object of the invention is the development of a method of extracting mineral oil from subterranean formation by flooding comprising the steps of forcing an aqueous liquid into a subterranean formation containing mineral oil and displacing the mineral oil through at least one bore hole in the subterranean formation, said aqueous liquid containing from 0.01% to 15% by weight of an amphoteric surface-active compound selected from the group consisting of (1) a betaine having the formula

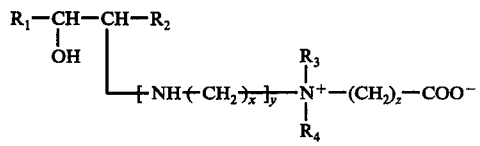

wherein $R_1$ and $R_2$ are members selected from the group consisting of hydrogen and alkyl having from 1 to 18 carbon atoms, with the proviso that the sum of the carbon atoms in $R_1 + R_2$ is from 9 to 18, $R_3$ and $R_4$ are members selected from the group consisting of lower alkyl and lower alkylol, $x$ is an integer from 2 to 4, $y$ is an integer from 0 to 1 and $z$ is an integer from 1 to 4, and (2) mixtures of said betaine with up to 20% by weight of an acid having the formula

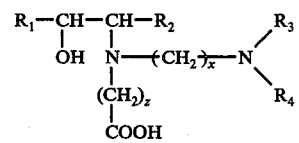

wherein $R_1$, $R_2$, $R_3$, $R_4$, $x$ and $z$ have the above-assigned values.

These and other objects of the invention will become more apparent as the description thereof proceeds.

DESCRIPTION OF THE INVENTION

Unexpectedly, it has now been found that compounds of Formula I

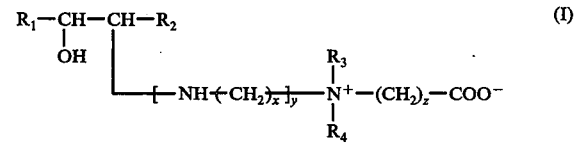

wherein $R_1$ and $R_2$ are aliphatic hydrocarbon radicals having 1 to 18 carbon atoms and/or hydrogen, wherein the sum of the carbon atoms of $R_1$ and $R_2$ is 9 to 18, $R_3$ and $R_4$ can be the same or different and represent lower alkyl or lower alkylol groups, $x$ represents an integer of 2 to 4, $y$ represents either 0 or 1, and $z$ represents an integer of from 1 to 4, constitute excellent interfacial-active agents in flood water in the extraction of mineral oil and have satisfactory solubility in formation water having a high salt content.

The present invention, therefore, relates to a method of extracting mineral oil from subterranean formation by flooding comprising the steps of forcing an aqueous liquid into a subterranean formation containing mineral oil and displacing the mineral oil through at least one bore hole in the subterranean formation, said aqueous liquid containing from 0.01% to 15% by weight of an amphoteric surface-active compound selected from the group consisting of (1) a betaine having the formula

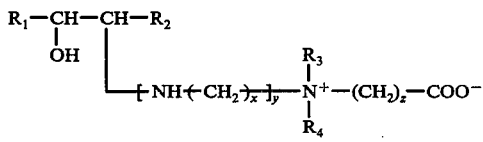

wherein $R_1$ and $R_2$ are members selected from the group consisting of hydrogen and alkyl having from 1 to 18 carbon atoms, with the proviso that the sum of the carbon atoms in $R_1 + R_2$ is from 9 to 18, $R_3$ and $R_4$ are members selected from the group consisting of lower alkyl and lower alkylol, $x$ is an integer from 2 to 4, $y$ is an integer from 0 to 1 and $z$ is an integer from 1 to 4, and (2) mixtures of said betaine with up to 20% by weight of an acid having the formula

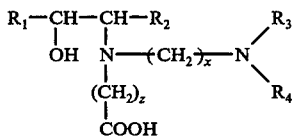

wherein $R_1$, $R_2$, $R_3$, $R_4$, $x$ and $z$ have the above-assigned values.

The compounds to be used in accordance with the invention can be produced by reacting an aminoalkanol of Formula II

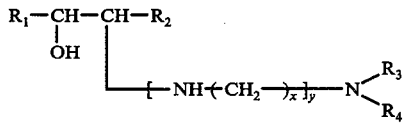 (II)

wherein $R_1$ to $R_4$ and $x$ and $y$ have the significance given in Formula I, in a known manner with an equimolar quantity of a monohaloalkanoic acid dissolved in water, or salts thereof. (See Houben-Weyl, Methoden der Organischen Chemie, Vol. 11/2 [1958] page 630.)

If two amino groups ($y = 1$) are present in the reacted aminoalkanol, a secondary reaction during quaternization leads to a product in which the monohaloalkanoic acid has attacked the secondary nitrogen atom and not the tertiary nitrogen atom. This secondary product, to which Formula III thus applies,

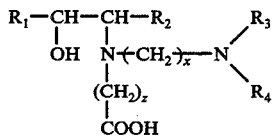 (III)

can amount to 20% by weight of the total quantity in technically produced betaines (I) to be used in accordance with the invention.

However, the presence of the secondary product of Formula III is in no way disadvantageous, so that the technically produced products can be used in the same way as the purified compounds corresponding to Formula I.

By way of example, the aminoalkanols of Formula II can be produced analogously to the processes, given in commonly-assigned U.S. patent application Ser. No. 683,322, filed May 5, 1976, from epoxyalkanes of Formula IV

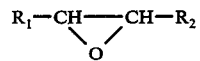 (IV)

and amine compounds of Formula V

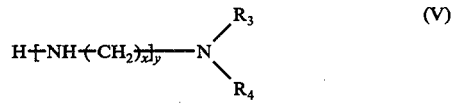 (V)

Virtually all epoxyalkanes having a non-terminal or terminal epoxy grouping, 11 to 20 carbon atoms and preferably an unbranched alkyl chain, are suitable as the starting material. Mixtures of epoxyalkanes are also used, for example, those having differing chain lengths and/or with the epoxy group statistically distributed over the chain in the form of isomers. The epoxyalkanes in accordance with Formula IV are obtainable in a known manner by epoxidation of corresponding olefin or olefin mixtures.

Suitable amines (V) are secondary amines such as dimethylamine, methylethylamine, diethylamine, dibutylamine or diethanolamine as well as asymmetrically disubstituted diamines, such as N,N-dimethylethylenediamine, N,N-dimethylpropylene diamine, N-methyl-N-ethylethylene diamine, N,N-diethylethylene diamine, N,N-diethanolpropylene diamine or N,N-diethanoltetramethylene diamine, However, the radicals $R_3$ and $R_4$ are preferably methyl radicals.

Monohaloalkanoic acids having 1 to 5 carbon atoms or salts thereof, particularly sodium chloroacetate, can be used for the quaternization reaction of the aminoalkanols.

The reason for the special advantage of the betaines, in accordance with the invention, of Formula I is that they cannot only be dissolved and used in soft water or flood water having small quantities of salt, but also in formation water having a high salt content of such salts as sodium or calcium salts. This advantage has a special importance in the secondary or tertiary extraction of mineral oil from German deposits in which formation water having high salt contents is almost exclusively available.

In accordance with the invention, the amphoteric compounds corresponding to Formula I, or the technically produced products which, in addition, optionally contain compounds of Formula III, are used in concentrations of from 0.01% to 15% by weight, preferably 0.1% to 5% by weight, relative to the total quantity of flood water.

When extracting mineral oil by flooding, further additional agents can be used in the customary effective concentrations in the flood water in addition to the products to be used in accordance with the invention. Such agents are, for example, co-surface-active compounds, additional electrolytes, such as inorganic acids, bases or salts, corrosion inhibitors, microbiocides and agents for reducing the mobility, such as water-soluble polymers of the hydrolyzed acrylamide polymer or copolymer type.

It will be appreciated that the total quantity of flood water, which has to be used for the secondary or tertiary extraction of mineral oil, depends upon the volume of pores in the oil-bearing earth formation and is approximately 5% to 50% or more of the pore volume. It will be appreciated that the use of larger quantities of flood water is advisable when permitted by the economy of delivering mineral oil by secondary or tertiary methods.

When the betaines of Formula I, or the technical products which optionally and additionally contain compounds of Formula III, are used in accordance with the invention, the methods of mineral oil extraction can be carried out in conformity with the known prior art.

C) and the glycerine was washed out with water. 258 gm (90% of theory) of the corresponding aminoalkanol purified by distillation were added to an aqueous solution of 104 gm of sodium chloroacetate and agitated for 0.5 hours at 80° to 90° C until an homogeneous phase had formed. The betaine has the characteristic data given in Table I.

Further products in accordance with the invention were produced analogously to the method given in Examples 1 and 2. They are also described in Table I.

TABLE I

| Product | Epoxide $R_1$ | $R_2$ | Amine $R_3$ | $R_4$ | x | y | Active Content % | NaCl Content % | pH Value % Solution |
|---|---|---|---|---|---|---|---|---|---|
| I 14 DM-B | $C_{11}$–$C_{14}^{(1)}$ | | $CH_3$ | $CH_3$ | — | 0 | 47.9 | 8.75 | 6.05 |
| I 58 DM-B | $C_{15}$–$C_{18}^{(2)}$ | | $CH_3$ | $CH_3$ | — | 0 | 30.6 | 4.30 | 6.05 |
| E 24 DM-B | $C_{12}/C_{14}^{(3)}$ | H | $CH_3$ | $CH_3$ | — | 0 | 30.1 | 4.79 | 6.05 |
| E 46 DM-B | $C_{14}/C_{16}^{(4)}$ | H | $CH_3$ | $CH_3$ | — | 0 | 28.5 | 4.10 | 6.05 |
| E 68 DM-B | $C_{16}/C_{18}^{(5)}$ | H | $CH_3$ | $CH_3$ | — | 0 | 18.5 | 1.61 | 6.05 |
| E 24 DE-B | $C_{12}/C_{14}^{(3)}$ | H | $C_2H_5$ | $C_2H_5$ | — | 0 | 33.8 | 4.51 | 6.05 |
| I 14 DMAP-B | $C_{11}$–$C_{14}^{(1)}$ | | $CH_3$ | $CH_3$ | 3 | 1 | 35.7 | 5.54 | 9.05 |
| I 14 DMAP-BN[6] | $C_{11}$–$C_{14}^{(1)}$ | | $CH_3$ | $CH_3$ | 3 | 1 | 38.6 | 5.4 | 7.0 |
| I 58 DMAP-B | $C_{15}$–$C_{18}^{(2)}$ | | $CH_3$ | $CH_3$ | 3 | 1 | 35.6 | 4.35 | 8.40 |
| I 58 DMAP-BN[6] | $C_{15}$–$C_{18}^{(2)}$ | | $CH_3$ | $CH_3$ | 3 | 1 | 40.8 | 4.53 | 7.00 |
| E 46 DMAP | $C_{14}/C_{16}^{(4)}$ | H | $CH_3$ | $CH_3$ | 3 | 1 | 36.2 | 4.7 | — | z is 1 in each instance
[1]Epoxide mixture as described in Example 2.
[2]Epoxide mixture as described in Example 1.
[3]Epoxide mixture of the chain length distribution approximately 60% by weight of $C_{12}$, approximately 39% by weight of $C_{14}$, and approximately 87% by weight of terminal epoxy groups.
[4]Epoxide mixture of the chain length distribution approximately 60% by weight of $C_{14}$, approximately 39% by weight of $C_{16}$, and approximately 82% by weight of terminal epoxy groups.
[5]Epoxide mixture of the chain length distribution approximately 46% by weight of $C_{16}$, approximately 45% by weight of $C_{18}$, and approximately 60% by weight of terminal epoxy groups.
[6]Product neutralized with acetic acid.

The following examples are intended to further illustrate this invention, but without limiting the invention to these examples.

EXAMPLES

The first examples give the details for the production of the betaines of Formula I employed in the process.

EXAMPLE 1

255 gm (approximately 1 mol) of a $C_{15}$–$C_{18}$ epoxide mixture (chain length distribution of the nonterminal epoxide mixture approximately 26% by weight $C_{15}$, approximately 35% by weight $C_{16}$, approximately 31% by weight $C_{17}$ and approximately 6% by weight $C_{18}$), 612 gm (6 mols) of N,N-dimethyl-1,3-propylenediamine and 9 gm (0.5 mol) of water were agitated for 5 hours at 200° C in an autoclave. The maximum pressure was 25 to 30 atmospheres. The surplus diamine was distilled off after the reaction, and the 305 gm (85% of theory) of aminoalkanol obtained were added to an aqueous solution of the equimolar quantity (99 gm) of sodium chloroacetate. The mixture was agitated at 80° C to 100° C until an homogeneous phase was formed (0.5 hours) and, if required, can be neutralized with acetic acid. The characteristic data of the betaine obtained are given in Table I.

EXAMPLE 2

112 gm (1.1 mols) of N,N-dimethyl-1,3-propylenediamine were added drop by drop at 190° to 200° C to 198 gm (approximately 1 mol) of a $C_{11}$–$C_{14}$ epoxide mixture (chain length distribution of the non-terminal epoxide mixture: approximately 22% by weight $C_{11}$, approximately 30% by weight $C_{12}$, approximately 26% by weight $C_{13}$, and approximately 22% by weight $C_{14}$), 18 gm (0.2 mol) of glycerine and a few drops of N,N-dimethyl-1,3-propylenediamine. The mixture was agitated for a further two hours under reflux (200° to 210°

EXAMPLE 3

The reduction in the surface tension of aqueous solutions having a salt content of 20% by weight of sodium chloride by adding products, in accordance with the invention, in concentrations of 10 to 1,000 ppm., calculated on the active content of betaine, was determined at 18° C by the ring adhesion method. The aqueous 20% by weight sodium chloride solution without an additive of surface-active agents had a surface tension of 63.1 dyn/cm at 18° C. The results given in Table II show that the surface tension was considerably reduced by adding the compounds in accordance with the invention.

TABLE II

| Product | Surface Tension (dyn/cm) | | |
|---|---|---|---|
| | 10 ppm | 100 ppm | 1,000 ppm |
| E 24 DM-B | 37.8 | 30.5 | 30.1 |
| E 46 DM-B | 31.6 | 29.3 | 28.4 |
| I 14 DMAP-B | 48.9 | 32.5 | 29.5 |
| I 14 DMAP-BN | 56.1 | 37.9 | 29.7 |
| I 58 DMAP-BN | 33.7 | 28.3 | 27.7 |

EXAMPLE 4

Aqueous solutions for the flooding of oil-bearing formations are produced with the products in accordance with the invention, E 24 DM-B, E 46 DM-B, I 14 DMAP-B, I 14 DMAP-BN, and I 58 DMAP-BN (see Table I) by mixing the following constituents. All parts are parts by weight.

TABLE III

| Product | NaCl | $CaCl_2$ | Water |
|---|---|---|---|
| E 24 DM-B | 0.5 | 20.0 | — | 79.5 |
| E 24 DM-B | 10.0 | 3.5 | — | 86.5 |
| E 46 DM-B | 0.75 | 5.0 | 0.01 | 94.24 |
| E 46 DM-B | 1.0 | 15.0 | 0.05 | 83.95 |

TABLE III-continued

| Product | NaCl | CaCl$_2$ | Water |
| --- | --- | --- | --- |
| E 46 DM-B | 4.75 | 4.1 | — | 91.15 |
| I 14 DMAP-B | 0.6 | 20.0 | 0.2 | 79.2 |
| I 14 DMAP-BN | 0.8 | 13.5 | 0.3 | 85.4 |
| I 14 DMAP-BN | 1.5 | 2.5 | — | 96.0 |
| I 58 DMAP-BN | 0.1 | 18.4 | 0.1 | 81.4 |
| I 58 DMAP-BN | 0.6 | 11.7 | — | 87.7 |
| I 58 DMAP-BN | 2.5 | 10.0 | 0.14 | 87.36 |

When flooding core samples of oil-bearing formations (lime sandstone, Berea sandstone), the mixtures exhibited satisfactory effects during the displacement or extraction of mineral oil. The same satisfactory result can be obtained by using a corresponding quantity of the products I 14 DM-B, I 58 DM-B, E 68 DM-B, E 24 DE-B, I 58 DMAP-B, and E 46 DMAP (see Table I) instead of the said products in accordance with the invention.

The flooding of oil-bearing formations was effected by any of the above solutions by pumping the same into one or two bore holes which were adjacent to delivery bore holes, as is customary in the method of flooding.

Preferably the present invention is directed to the use of those betaines in flooding where at least one of $R_1$ or $R_2$ is hydrogen, in other words, the terminal compounds designated above by the prefix "E".

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method of extracting mineral oil from subterranean formation by flooding comprising the steps of forcing an aqueous liquid into a subterranean formation containing mineral oil and displacing the mineral oil through at least one bore hole in the subterranean formation, said aqueous liquid containing from 0.01% to 15% by weight of an amphoteric surface-active compound selected from the group consisting of (1) a betaine having the formula

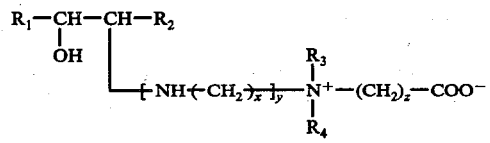

wherein $R_1$ and $R_2$ are members selected from the group consisting of hydrogen and alkyl having from 1 to 18 carbon atoms, with the proviso that at least one of $R_1$ and $R_2$ is hydrogen and the sum of the carbon atoms in $R_1 + R_2$ is from 9 to 18, $R_3$ and $R_4$ are members selected from the group consisting of lower alkyl and lower alkylol, $x$ is an integer from 2 to 4, $y$ is an integer from 0 to 1 and $z$ is an integer from 1 to 4, and (2) mixtures of said betaine with up to 20% by weight of an acid having the formula

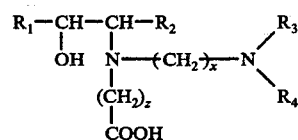

wherein $R_1$, $R_2$, $R_3$, $R_4$, $x$ and $z$ have the above-assigned values.

2. The method of claim 1 wherein said aqueous liquid contains from 0.1% to 5% by weight of said amphoteric surface-active compound.

3. The method of claim 1 wherein one of $R_1$ and $R_2$ is hydrogen.

4. The method of claim 1 wherein said aqueous liquid has a dissolved salt content of up to 30% by weight.

5. The method of claim 4 wherein said dissolved salt content comprises water-soluble salts of sodium and calcium.

* * * * *